United States Patent
Chaiken et al.

(10) Patent No.: US 10,866,623 B2
(45) Date of Patent: Dec. 15, 2020

(54) INFORMATION HANDLING SYSTEM AND METHOD TO DETECT AND RECOVER FROM NO POWER/NO POST FAILURES

(71) Applicant: DELL PRODUCTS L.P., Round Rock, TX (US)

(72) Inventors: Craig L. Chaiken, Pflugerville, TX (US); Michael W. Arms, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 73 days.

(21) Appl. No.: 16/193,722

(22) Filed: Nov. 16, 2018

(65) Prior Publication Data

US 2020/0159302 A1 May 21, 2020

(51) Int. Cl.
| | | |
|---|---|---|
| *G06F 1/30* | (2006.01) | |
| *G06F 1/28* | (2006.01) | |
| *G06F 9/4401* | (2018.01) | |
| *G06F 1/24* | (2006.01) | |
| *G06F 11/14* | (2006.01) | |

(52) U.S. Cl.
CPC ............... *G06F 1/30* (2013.01); *G06F 1/24* (2013.01); *G06F 1/28* (2013.01); *G06F 9/4401* (2013.01); *G06F 9/4418* (2013.01); *G06F 11/1417* (2013.01); *G06F 11/1441* (2013.01)

(58) Field of Classification Search
CPC ..... G06F 1/04; G06F 1/28; G06F 1/30; G06F 9/4418; G06F 11/1417; G06F 11/142; G06F 11/1441; G06F 9/4401; G06F 1/24
See application file for complete search history.

(56) References Cited

U.S. PATENT DOCUMENTS

| | | | |
|---|---|---|---|
| 6,665,802 B1 * | 12/2003 | Ober | G06F 1/26 713/320 |
| 9,652,250 B2 * | 5/2017 | Su | G06F 9/4401 |
| 10,379,922 B1 * | 8/2019 | Bell | G06F 9/45558 |

(Continued)

OTHER PUBLICATIONS

"Parallel Real-Time Clock With CPU Supervisor and External SRAM Nonvolatile Memory Backup". SLUS464C. Jun. 2002. Texas Instruments Incorporated. (Year: 2002).*

(Continued)

*Primary Examiner* — Thomas J. Cleary

(74) *Attorney, Agent, or Firm* — Egan Peterman Enders Huston

(57) ABSTRACT

Embodiments of information handling systems (IHSs) and methods are provided herein to automatically detect and recover from boot failures, such as no power failures and no POST failures, without suffering the information loss that typically occurs in conventional recovery methods. One embodiment of an IHS disclosed herein includes a system real-time clock (RTC) configured to maintain current date and time values, a host processor configured to execute boot firmware and perform a Power-On Self-Test (POST) during a boot process for the IHS, and an embedded controller (EC) configured to execute embedded controller firmware during the boot process to detect a no power failure or a no POST failure, and reset or remove power from the system RTC if a no power failure or a no POST failure is detected.

22 Claims, 3 Drawing Sheets

(56) References Cited

U.S. PATENT DOCUMENTS

| | | | |
|---|---|---|---|
| 2003/0163765 A1* | 8/2003 | Eckardt | G06F 11/2284 |
| | | | 714/36 |
| 2005/0044404 A1* | 2/2005 | Bhansali | G06F 21/88 |
| | | | 726/26 |
| 2006/0150002 A1* | 7/2006 | Yoshida | G06F 11/1417 |
| | | | 714/10 |
| 2008/0155332 A1* | 6/2008 | Landers | G06F 11/1417 |
| | | | 714/36 |
| 2008/0288764 A1* | 11/2008 | Lu | G06F 9/4405 |
| | | | 713/2 |
| 2010/0312946 A1* | 12/2010 | Bold | G06F 11/0766 |
| | | | 711/102 |
| 2011/0161646 A1* | 6/2011 | Yu | G06F 9/4401 |
| | | | 713/2 |
| 2012/0173922 A1* | 7/2012 | Cheng | G06F 11/2025 |
| | | | 714/13 |
| 2015/0067311 A1* | 3/2015 | Forristal | G06F 8/66 |
| | | | 713/2 |
| 2017/0123923 A1* | 5/2017 | Chang | G06F 21/575 |
| 2019/0042278 A1* | 2/2019 | Pirvu | G06F 9/4411 |
| 2020/0089572 A1* | 3/2020 | Bodner | G06F 11/1417 |

OTHER PUBLICATIONS

Dell, "How to Reset Real Time Clock (RTC) to Recover Your Dell Portable System", Article ID: SLN304892, Oct. 22, 2018, 7 pgs.
Deming, "Chapter 7 The Components of Intel Active Management Technology", 1993, 30 pgs.

* cited by examiner

INFORMATION HANDLING SYSTEM AND METHOD TO DETECT AND RECOVER FROM NO POWER/NO POST FAILURES

FIELD

This invention relates generally to information handling systems (IHSs), and more particularly, to IHS software and hardware components and related methods for recovering from boot failures, such as no power and no POST failures.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems (IHSs) typically include a boot system such as, for example, a Basic Input/Output System (BIOS) or Unified Extensible Firmware Interface (UEFI) that operates to initialize hardware components during the boot process and to provide runtime services for operating system (OS) and programs. The boot system code is implemented as boot firmware, which is typically stored in non-volatile memory, such as read only memory (ROM) or a Flash memory device. When the IHS is powered on or rebooted, a processing device within the IHS may access the boot firmware stored in non-volatile memory, via a chipset, and store a copy of the boot firmware within system memory. The processing device may then execute the boot firmware to implement a boot process for the IHS. For example, the boot firmware may be executed to configure hardware components of the IHS, perform a Power-On Self-Test (POST) to ensure the hardware configuration is valid and working properly, discover and initialize devices, and launch a bootloader to load an OS into system memory.

In some cases, the IHS may fail to complete the POST, or may fail to power on completely. No power failures usually occur when the chipset is stuck in a failure state, or when a management engine (ME) within the chipset is in an unbootable state. A no POST failure, on the other hand, may occur when the non-volatile memory storing the boot system is in an unbootable state. No power failures and no POST failures are often resolved by removing the battery that powers the system real-time clock (RTC). Removing the RTC battery resolves no power failures by resetting the chipset and unprovisioning the ME, and resolves no POST failures by restoring the non-volatile memory to default settings. However, such a solution has many disadvantages. First, since the end user cannot remove the RTC battery, the know solution requires the end user to return the system to a service center for repair, resulting in end user down time and repair costs. In addition, removing the RTC battery is rather destructive, as it erases the date and time maintained by the system RTC, non-volatile memory settings and ME provisioning.

One known recovery method simulates removing the RTC battery in response to an end user holding the system power button down for 25 seconds. Like the previous method, simulating RTC battery removal is a rather destructive method (i.e., date and time lost, system memory settings lost, ME provisioning lost) for recovery from no power/no POST failures. For this reason, end users must call in to a service center to learn of this recovery method, resulting in end user down time and a cost associated with each service call.

SUMMARY OF THE INVENTION

The following description of various embodiments of information handling systems and related methods is not to be construed in any way as limiting the subject matter of the appended claims.

According to various embodiments of the present disclosure, information handling systems and methods are provided herein to automatically detect and recover from no power failures and no POST failures without suffering the information loss that typically occurs when conventional recovery methods are used to recover from such failures.

According to one embodiment, an information handling system (IHS) is provided herein comprising a real-time clock (RTC), a computer readable non-volatile (NV) memory, a host processor and an embedded controller (EC). The RTC may be configured to maintain current date and time values. The computer readable NV memory may be configured to store a plurality of firmware regions including boot firmware, management engine (ME) firmware, and embedded controller (EC) firmware. The host processor may be configured to execute the boot firmware when the IHS is powered on or rebooted to implement a boot process for the IHS and to perform a Power-On Self-Test (POST) during the boot process. During the boot process, the EC may execute program instructions contained within the EC firmware to detect a no power failure or a no POST failure. In one example implementation, the EC may detect a no power failure, if one or more sleep state exit signals supplied from a platform controller hub (PCH) of the IHS fails to toggle within a predetermined timeout. In another example implementation, the EC may detect a no POST failure, if the boot firmware performs the POST a predetermined number of times. If a no power failure or a no POST failure is detected by the EC, the EC may reset or remove power from the RTC to resolve the no power/no POST failure.

In some embodiments, the EC may execute the program instructions contained within the EC firmware to set a no power boot flag within the EC upon detecting the no power failure, set a no POST boot flag within the EC upon detecting the no POST failure, and power cycle the IHS, after resetting or removing power from the RTC, to restart the boot process if a no power/no POST failure is detected.

During the boot process, the boot firmware may be further executable by the host processor to read and clear boot flags set within the EC. If a no power boot flag is read, the boot firmware may clear a RTC power loss status flag stored in a register of the RTC. Clearing the RTC power loss status flag retains current settings within the boot firmware and ME firmware regions of the computer readable NV memory by preventing the boot firmware from loading default settings into the boot firmware and ME firmware regions. However, if a no POST boot flag is read, the boot firmware may load default settings within the boot firmware and the ME firmware regions of the computer readable NV memory to resolve the no POST failure.

Upon reading a no power boot flag or a no POST boot flag, the boot firmware may restore system date and time values maintained by the boot firmware using date and time values obtained from a clock included within the EC, and send a message to the EC indicating that the boot process is successful. If the EC does not receive the message within a predetermined timeout, the EC may execute the program instructions contained within the EC firmware to increment a POST attempt count and determine if the POST attempt count exceeds the maximum count. If the POST attempt count does not exceed the maximum count, the EC may execute the program instructions contained within the EC firmware to power cycle the IHS to restart the boot process. However, if the POST attempt count exceeds the maximum count, the EC may execute the program instructions contained within the EC firmware to detect the no POST failure.

According to another embodiment, a method is provided herein for automatically detecting and recovering from a no power failure. The disclosed method may be performed by an information handling system (IHS) comprising a system real-time clock (RTC) during a boot process for the IHS. In general, the method may include power sequencing components of the IHS when the IHS is powered on, monitoring sleep state exit signals coming from a platform controller hub (PCH) of the IHS to detect toggling of the sleep state exit signals, and detecting a no power failure if one or more of the sleep state exit signals fails to toggle within a predetermined timeout.

Upon detecting a no power failure, the method may further include setting a no power boot flag within an embedded controller (EC) of the IHS, resetting or removing power from the system RTC, and power sequencing the IHS again to restart the boot process. In some embodiments, the steps of power sequencing components of the IHS, monitoring sleep state exit signals, detecting a no power failure, setting a no power boot flag, resetting or removing power from the system RTC and power sequencing the IHS again to restart the boot process may be performed by the EC executing EC firmware.

After power sequencing the IHS to restart the boot process, the method may further include reading and clearing the no power boot flag set within the EC, clearing a RTC power loss status flag stored within a register of the system RTC, restoring system date and time values using date and time values obtained from a clock included within the EC, and sending a message to the EC indicating that the boot process is successful. In some embodiments, the steps of reading and clearing the no power boot flag, clearing a RTC power loss status flag, restoring system date and time values and sending a message to the EC may be performed by a host processor of the IHS executing boot firmware.

According to another embodiment, a method is provided herein for automatically detecting and recovering from a no POST failure. The disclosed method may be performed by an information handling system (IHS) comprising a system real-time clock (RTC) during a boot process for the IHS. In general, the method may include power sequencing components of the IHS when the IHS is powered on, waiting to receive a message indicating that the boot process is successful, and detecting a no POST failure if the message is repeatedly not received within a predetermined timeout.

In some embodiments, additional method steps may be performed prior to detecting a no POST failure. For example, the method may include incrementing a POST attempt count if the message is not received within the predetermined timeout, and determining if the POST attempt count exceeds the maximum count. If the POST attempt count does not exceed a maximum count, the method may further include power sequencing the IHS to restart the boot process. However, the method may detect the no POST failure if the POST attempt count exceeds the maximum count.

Upon detecting a no POST failure, the method may further include setting a no POST boot flag within an embedded controller (EC) of the IHS, resetting or removing power from the system RTC, and power sequencing the IHS again to restart the boot process. In some embodiments, the steps of power sequencing components of the IHS, waiting to receive a message, detecting a no POST failure, setting a no POST boot flag, resetting or removing power from the system RTC, and power sequencing the IHS again to restart the boot process may be performed by the EC executing EC firmware.

After said power sequencing the IHS to restart the boot process, the method may further include reading and clearing the no POST boot flag set within the EC, loading default settings within boot firmware and management firmware regions of a computer readable non-volatile memory included within the IHS, restoring system date and time values using date and time values obtained from a clock included within the EC, and sending a message to the EC indicating that the boot process is successful. In some embodiments, the steps of reading and clearing the no POST boot flag, loading default settings, restoring system date and time values and sending a message to the EC may be performed by a host processor of the IHS executing boot firmware.

BRIEF DESCRIPTION OF THE DRAWINGS

Other advantages of the present disclosure will become apparent upon reading the following detailed description and upon reference to the accompanying drawings in which.

Figure 1:
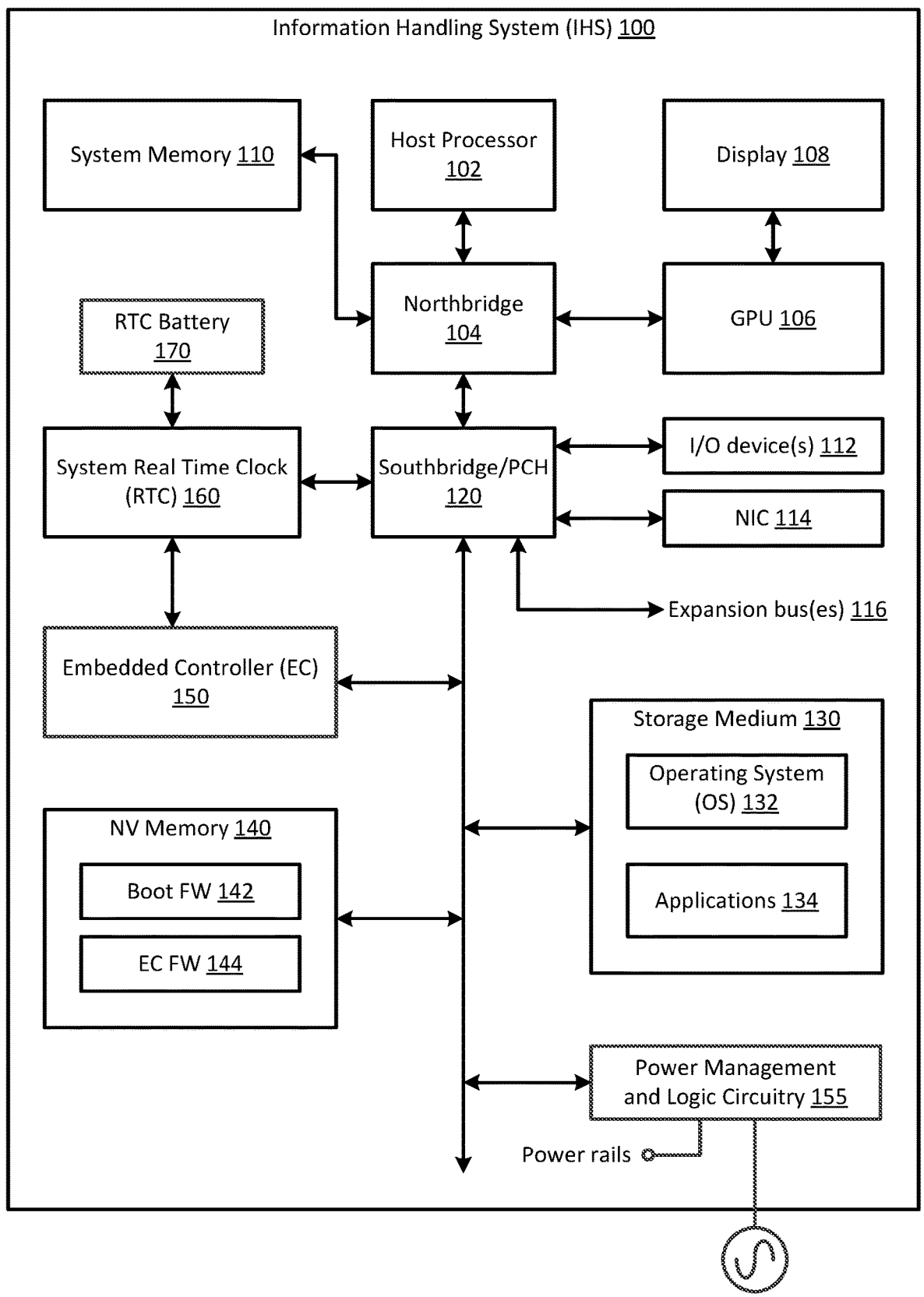
FIG. 1 is a block diagram illustrating one embodiment of an information handling system (IHS) in accordance with the present disclosure.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

FIG. 1 is a block diagram of an information handling system 100 (e.g., a desktop computer, laptop computer, tablet computer, MP3 player, personal data assistant (PDA), cell phone, etc.) as it may be configured according to one embodiment of the present disclosure. In this regard, it should be understood that the configuration of FIG. 1 is exemplary only, and that the disclosed methods may be implemented on other types of information handling systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

In the embodiment shown in FIG. 1, information handling system (IHS) 100 includes one or more host processors 102, northbridge controller 104, graphics processor unit (GPU) 106, display device 108, system memory 110, input/output (I/O) devices 112, network interface card (NIC) 114, expansion bus(es) 116, southbridge controller 120, computer readable storage medium 130, computer readable memory 140, embedded controller (EC) 150, power management and logic circuitry 155, system real time clock (RTC) 160 and RTC battery 170. It is noted, however, that while certain components of an information handling system are shown in FIG. 1 for illustrating embodiments of the present disclosure, the information handling system is not restricted to including only those components shown in FIG. 1 and described below.

Host processor 102 may include various types of programmable integrated circuits (e.g., a processor such as a controller, microcontroller, microprocessor, ASIC, etc.) and programmable logic devices (such as a field programmable gate array "FPGA", complex programmable logic device "CPLD", etc.). According to one embodiment, host processor 102 may include at least one central processing unit (CPU) having one or more processing cores. The CPU may include any type of processing device, such as an Intel Pentium series processor, an Advanced Micro Devices (AMD) processor or another processing device. In some embodiments, host processor 102 may include other types of processing devices including, but not limited to, a graphics-derivative processor (such as a physics/gaming processor), a digital signal processor (DSP), etc.

Northbridge controller 104 is coupled to host processor 102 and configured to coordinate communication between host processor 102 and one or more IHS components. In the embodiment shown in FIG. 1, northbridge controller 104 is further coupled to GPU 106 and system memory 110. Although illustrated as a separate component in FIG. 1, northbridge controller 104 may alternatively be integrated into host processor 102, for example, when host processor 102 is implemented as a silicon-on-chip (SoC) processor.

GPU 106 is coupled to host processor 102 to coordinate communication between the host processor and one or more display components of the IHS. In the embodiment shown in FIG. 1, GPU 106 is coupled to display device 108 to provide visual images to the user. Display device 108 may be a display screen embedded within the chassis of the IHS, or an external display screen or monitor coupled to the IHS. In some embodiments, GPU 106 may be coupled to one or more display ports to support additional display functions. Although GPU 106 is illustrated as a separate integrated circuit chip (coupled to host processor 102 via a bus), GPU 106 may be integrated with host processor 102 when the host processor is implemented as a silicon-on-chip (SoC) processor.

System memory 110 is coupled to northbridge controller 104 and generally configured to store program instructions, which are executable by host processor 102. System memory 110 may be implemented using any suitable memory technology, including but not limited to, random access memory (RAM), read only memory (ROM), dynamic RAM (DRAM), synchronous DRAM (SDRAM), and other suitable storage mediums. When the information handling system is initially powered on or rebooted, a boot process is initiated to load boot firmware (e.g., BIOS or UEFI) into system memory 110. The boot firmware is executed by host processor 102 to configure hardware components of the information handling system, perform a Power-On Self-Test (POST) to ensure the hardware configuration is valid and working properly, discover and initialize devices, and launch a bootloader to load an operating system (OS) into system memory 110.

In some embodiments, southbridge controller 120 may be coupled to northbridge controller 104 via an internal bus. In other embodiments, southbridge controller 120 may be replaced by a platform controller hub (PCH) and connected directly to host processor 102 via a direct media interface (DMI). Southbridge controller/PCH 120 (otherwise referred to as a chipset) handles I/O operations for the IHS, and thus, may include a variety of communication interfaces and ports for communicating with various system components, such as input/output (I/O) devices 112, network interface card (NIC) 114, expansion bus(es) 116, computer readable storage medium 130, computer readable memory 140, embedded controller (EC) 150, power management and logic circuitry 155, and system real time clock (RTC) 160.

Examples of communication interfaces and ports that may be included within southbridge controller/PCH 120 include, but are not limited to, a Peripheral Component Interconnect (PCI) interface, a PCI-Express (PCIe) interface, a Serial Peripheral Interface (SPI), an Enhanced SPI (eSPI), a Serial AT Attachment (SATA) interface, a Low Pin Count (LPC) interface, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface. Examples of expansion bus(es) 116 that may be coupled to southbridge controller/PCH 120 include, but are not limited to, a PCI bus, a PCIe bus, a SATA bus, a USB bus, etc.

I/O devices 112 enable a user to interact with IHS 100. In some embodiments, one or more I/O devices 112 may be present within, or coupled to, IHS 100. In some embodiments, I/O device(s) 112 may be separate from the IHS and may interact with the IHS through a wired or wireless connection. Examples of I/O devices 112 include, but are not limited to, keyboards, keypads, touch screens, scanning devices, voice or optical recognition devices, and any other devices suitable for entering or retrieving data.

NIC 114 enables IHS 100 to communicate with one or more remote devices, systems and/or services via an external network using one or more communication protocols. The external network may be a local area network (LAN), wide area network (WAN), personal area network (PAN), or the like, and the connection to and/or between IHS 100 and the network may be wired, wireless or a combination thereof. NIC 114 may communicate data and signals to/from IHS 100 using any known communication protocol.

Computer readable storage medium 130 may be any type of persistent, non-transitory computer readable storage medium, such as one or more hard disk drives (HDDs) or solid-state drives (SSDs), and may be generally configured to store software and/or data. In some embodiments, computer readable storage medium 130 may be configured to store an operating system (OS) 132 for the IHS in addition to one or more user applications 134 and (optionally) user data. OS 132 and user application(s) 134 may generally contain program instructions, which may be executed by host processor 102 to perform various tasks and functions for the information handling system and/or for the user.

Computer readable memory 140 may include any type of non-volatile (NV) memory including, but not limited to, read-only memory (ROM), flash memory, and non-volatile random access memory (NVRAM), and may be generally configured to store software and/or firmware modules. The software and/or firmware modules stored within computer readable NV memory 140 may generally contain program instructions (or computer program code), which may be executed by host processor 102 to instruct components of IHS 100 to perform various tasks and functions for the information handling system. As shown in FIG. 1, for example, NV memory 140 may store boot firmware (FW) 142 and embedded controller (EC) firmware 144, in addition to other software and/or firmware modules.

Boot firmware 142 includes software and/or firmware modules for specifying hardware configuration settings, system date/time and boot sequence, etc. In some embodiments, boot firmware 142 may be implemented as a Basic Input/Output System (BIOS) and/or a Unified Extensible Firmware Interface (UEFI). When IHS 100 is powered on or rebooted, program instructions within boot firmware 142 may be executed by host processor 102 to configure hardware components of the IHS, perform a Power-On Self-Test (POST) to ensure the hardware configuration is valid and working properly, discover and initialize devices and launch a bootloader to load OS 132. Once launched, the bootloader within boot firmware 142 retrieves OS 132 from computer readable storage medium 130 and loads it into system memory 110.

Embedded controller (EC) 150 is configured to boot the information handling system and perform other functions for the information handling system. As described in more detail below with regard to FIG. 2, EC 150 may be configured to execute program instructions (e.g., a boot block) stored in internal ROM to initiate a boot process for the information handling system, retrieve EC firmware (EC FW) 142 from NV memory 140, store a local copy of the EC firmware in internal RAM, and execute the EC firmware to perform various steps of the methodology disclosed herein. For example, and as described in more detail below, EC 150 may execute the locally stored copy of EC firmware to detect and recover from boot failures, such as no power failures and no POST failures.

Power management and logic circuitry 155 may be included within IHS 100 for moderating the available power from a power source, supplying power to information handling system components and performing other power-related administrative tasks for the information handling system. The power source can be an external power source (e.g., mains power) and/or an internal power source, such as a battery. In addition to other tasks, power management and logic circuitry 155 provides operating voltages (e.g., 3.3V, 5V, 12V, 5V standby, etc.) on one or more power rails to various IHS components, such as host processor 102, PCH 120, and EC 150.

When IHS 100 is powered on or rebooted, power management and logic circuitry 155 follows a power sequence to supply operating voltages to the information handling system components in a particular order. In one embodiment, a basic power sequence may start with the standby power rails, which supplies power to EC 150 and PCH 120 first. Once PCH 120 enables power to the SPI/eSPI interface controllers, EC 150 continues power sequencing as directed by the sleep state exit signals (e.g., SLP_S5#, SLP_S4#, SLP_S3#, etc.) supplied by PCH 120, and power good signals that are supplied to the PCH to indicate that a voltage regulator coupled to an IHS component is providing a sufficient operating voltage. First SLP_S5# toggles, then SLP_S4#, and finally SLP_S3# would power on the host processor 102 voltages.

System real time clock (RTC) 160 is a battery-powered clock that may be included within a microchip on the system platform to provide an accurate date and time for the IHS. The microchip includes a small memory that stores current date and time values (e.g., year, month, day, hours, minutes, and seconds) maintained by the RTC. When the IHS is powered on or rebooted, boot firmware 142 reads the current date and time values from the memory in the RTC microchip, and uses such values to maintain accurate date and time values for the information handling system. Because system RTC 160 has its own power source (e.g., RTC battery 170), the date and time values maintained within the microchip are not lost when the IHS is powered down. As described in more detail below, EC 150 is coupled to system RTC 160 and configured to reset system RTC 160 or remove battery power from the RTC if the EC detects a no power failure or a no POST failure.

Figure 2:
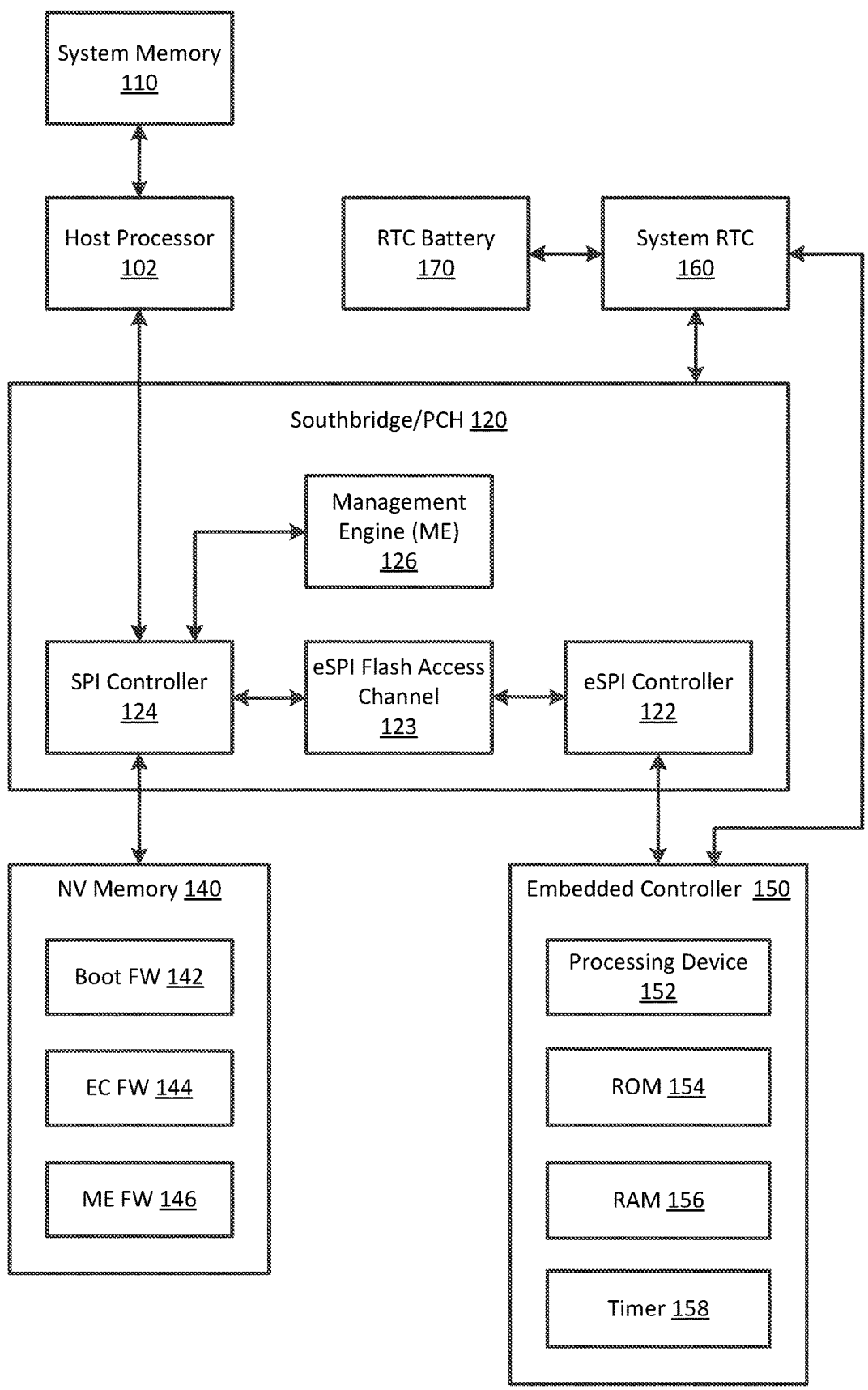
FIG. 2 is a block diagram illustrating additional details of various IHS components shown in FIG. 1.

FIG. 2 is a block diagram illustrating additional details of the host processor 102, system memory 110, southbridge/PCH 120 (hereinafter PCH 120), NV memory 140, EC 150, system RTC 160 and RTC battery 170 shown in FIG. 1. As shown in FIG. 2, PCH 120 may include Enhanced Serial Peripheral Interface (eSPI) controller 122, eSPI Flash access channel 123, SPI controller 124 and management engine (ME) 126, in addition to other hardware, software and firmware components. According to one embodiment, management engine 126 may be a micro-controller, or a secondary central processing unit (CPU), which is configured to run Intel® Active Management Technology (AMT) firmware services and applications. ME 126 continues to run when the host processor 102 is off, and thus, allows an IHS that is powered down to be remotely managed. For example, ME 126 enables an administrator to remotely manage the IHS (e.g., reboot, reinstall an OS, etc.), and allows the PCH microcode to be updated.

The SPI and eSPI controllers 122 and 124 included within PCH 120 enable data and information to be exchanged between PCH 120 (i.e., a master device) and one or more slave devices (e.g., host processor 102 and/or EC 150). In the embodiment shown in FIG. 2, eSPI controller 122 manages information flow between PCH 120 and EC 150, while SPI controller 124 controls information flow between PCH 120, host processor 102 and NV memory 140. When the power rails supplied to PCH 120 are sufficient to power the PCH and the PCH comes out of reset, the PCH assumes control of NV memory 140 and provides host processor 102 and EC 150 indirect access to memory regions within NV memory 140. For example, host processor 102 is provided indirect access to memory locations within NV memory 140 through SPI Flash controller 156. EC 150 is provided indirect access to memory locations within NV memory 140 through eSPI Controller 152, eSPI Flash access channel 154, and SPI Flash controller 156. In some embodiments, host processor 102 and EC 150 may send access requests to PCH 120 to retrieve firmware modules stored within NV memory 140 on behalf of the host processor and EC.

NV memory 140 may be generally configured to store boot firmware 142, EC firmware 144, and management engine firmware 146, in addition to other firmware and access control descriptor regions. As noted above, boot firmware (Boot FW) 142 may include system BIOS and/or UEFI firmware, which is loaded into system memory 110 and executed by host processor 102 to boot and configure the information handling system. EC firmware (EC FW) 144 includes program instructions, which are executable by EC 150 to perform various steps of the methodology disclosed herein, as well as other functions for the information handling system. Management Engine firmware (ME FW) 146 includes program instructions, which are executable by management engine 126 to manage IHS 100 remotely. In addition to remote management capabilities, ME firmware 146 is the owner of the PCH 120 and the SPI/eSPI interfaces, and thus, acts as the gatekeeper for access to the PCH. As such, ME firmware 146 can block code from writing to the SPI part without proper credentials.

EC 150 may generally include read only memory (ROM) 154 for storing a boot block, random access memory (RAM) 156 for storing a local copy of the EC firmware 144 stored within NV memory 140, a processing device 152 for executing program instructions stored locally in ROM 154 and RAM 156, and a real time clock (RTC) 158 for maintaining current date and time values. The EC RTC 158 will continue to be powered by the EC's power rail when the RTC battery power is removed. Although not strictly limited to such, processing device 152 may be implemented as a programmable integrated circuit (e.g., a controller, microcontroller, microprocessor, ASIC, etc., or as a programmable logic device "PLD" such as FPGA, complex programmable logic device "CPLD", etc.), in one embodiment.

When IHS 100 is powered on or rebooted, processing device 152 may initiate a boot process for the information handling system by executing the boot block stored within ROM 154. As used herein, a "boot process" is a process or set of operations performed by one or more information handling system components to load and execute a boot system and prepare the information handling system for OS booting. In some embodiments, processing device 152 may execute program instructions within the boot block stored in ROM 154 to retrieve the EC firmware 144 stored in NV memory 140, store a local copy of the EC firmware 144 in RAM 156 and execute program instructions contained within the EC firmware. When PCH 120 comes out of reset, host processor 102 may retrieve the boot firmware 142 stored in NV memory 140, store a local copy of the boot firmware 142 into system memory 110 and execute program instructions within the boot firmware to configure hardware components of the IHS, perform a Power-On Self-Test (POST), discover and initialize devices and launch a boot-loader to load OS 132. In addition, ME 126 may execute its own locally stored boot block to retrieve the ME firmware 146 stored in NV memory 140, store a local copy of the ME firmware in internal RAM and execute program instructions within the ME firmware.

In some cases, the information handling system may fail to complete the POST (resulting in a no POST failure) or may fail to power on completely (resulting in a no power failure). As noted above, no power failures usually occur when the chipset (i.e., PCH 120) is stuck in a failure state, or the management engine (i.e., ME 126) is in an unbootable state. On the other hand, a no POST failure may occur if NV memory 140 is in an unbootable state. In the past, no power/no POST failures have been resolved by removing the battery (e.g., RTC battery 170) powering the system RTC 160, or by performing an end user-initiated method that simulates RTC battery removal. While such recovery methods are generally successful in resolving no power/no POST failures, these recovery methods are destructive (i.e., date and time lost, NV memory settings lost, ME provisioning lost) and require the end user to either make a service call or return the system to the service center for repair, which results in end user down time and increases costs associated with service calls and repairs.

To overcome these disadvantages, the present disclosure provides an improved system and non-destructive method to automatically detect and recover from no power/no POST failures. Unlike conventional recovery methods (i.e., removing or simulating removal of the RTC battery), the system and method disclosed herein is performed automatically by components of the information handling system, and thus, requires no interaction on the end user's part (i.e., no service call, no pressing the power button to initiate recovery, and no returning the system to the service center for repair). By providing the information handling system with the means to recover from no power/no POST failures, end user down time and costs associated with service calls and repairs may be significantly reduced.

Unlike conventional recovery methods, the improved system and method disclosed herein detects the type of boot failure, i.e., whether a no power failure or no POST failure has occurred, and responds accordingly. When recovering from no power/no POST failures, the improved system and method disclosed herein preserves the date and time values stored within system RTC 160 and the ME provisioning within ME 126, and thus, is significantly less destructive than conventional recovery methods. If a no power failure is detected, the improved system and method enables current settings within the boot firmware 142 and ME firmware 146 regions of NV memory 140 to be retained. If a no POST failure is detected, however, the improved system and method may load default settings into boot firmware 142 and ME firmware 146 regions of NV memory 140 to resolve the no POST failure. In addition, the improved system and method can successfully recover from one-time shorts (such as caused by a damaged or shorting cable), which can sometimes cause a no power failure.

Figure 3:
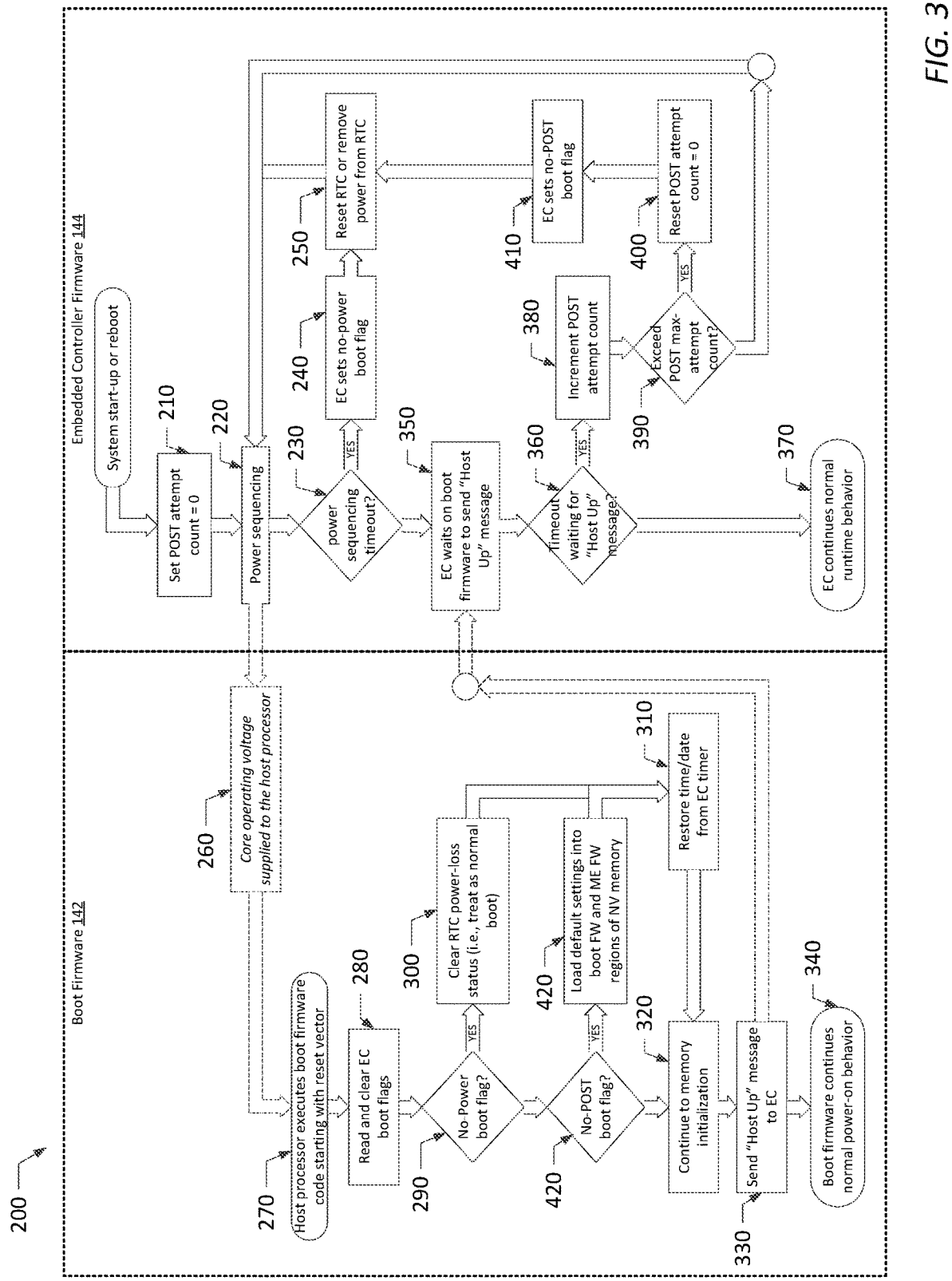
FIG. 3 is a flowchart diagram illustrating one embodiment of a method that may be performed during an IHS boot process to automatically detect and recover from boot process failures, such as no power failures and no POST failures.

FIG. 3 illustrates one embodiment of a method 200 that may be performed during an information handling system (IHS) boot process to automatically detect and recover from boot process failures, such as no power failures and no POST failures. As shown in FIG. 3, various steps of method 200 may be performed by EC 150 (executing EC firmware 144) and host processor 102 (executing boot firmware 142) during an information handling system boot process. As such, the flowchart shown in FIG. 3 represents a computer implemented method performed by hardware and firmware components of the information handling system. The computer implemented method shown in FIG. 3 improves how the information handling system functions, in at least some respects, by automatically detecting a boot failure (i.e., a no power failure or no POST failure), recovering from the boot failure without the need for user intervention, and retaining information (e.g., system date/time, ME provisioning and NV memory settings) that is typically lost when conventional recovery methods are used to recover from no power/ no POST failures.

According to one embodiment, method 200 may begin when an information handling system (such as IHS 100) is powered on or rebooted to begin a boot process. When the boot process initially begins, EC 150 sets a POST attempt count to zero (in step 210) and begins power cycling or power sequencing components of the information handling system (in step 220). As noted above, a power sequence involves supplying operating voltages to IHS components in a set order, and is controlled by sleep state exit signals (e.g., SLP_S5#, SLP_S4#, SLP_S3#, etc.) at each power sequencing stage and power good signals indicating that the operating voltage supplied to an IHS component is sufficient.

During the power sequencing phase (step 220), EC 150 monitors sleep state exit signals coming from the PCH 120 to detect toggling of the sleep state exit signals. For example, EC 150 may look for SLP_S5# to toggle first, followed by SLP_S3#. If either sleep state exit signal fails to toggle within a predetermined timeout (YES branch of step 230), EC 150 detects a no power failure, sets a no power boot flag within the EC (in step 240) and either resets system RTC 160 or removes power from the RTC (in step 250). In one example implementation, EC 150 may reset system RTC 160 by using an EC GPIO signal (e.g., RTC_RESET #) to pull RTCRST # on PCH 120 low for a short delay, before restoring it back to high to reset the system RTC. In another example implementation, EC 150 may remove power from the RTC by disconnecting the RTC battery 170 power from the RTC for a predetermined amount of time (e.g., 100 ms). As noted above, resetting or removing power from system RTC 160 resolves no power failures by resetting PCH 120 and unprovisioning ME 126. Once the RTC is reset, EC 150 power cycles the system (in step 220) to restart the boot process.

In a final stage of the power sequencing phase (step 220), host processor 102 receives a core operating voltage (in step 260) and begins executing program instructions within boot firmware 142 starting with the reset vector (in step 270). In step 280, boot firmware 142 reads and clears any boot flags set within EC 150. If a no POST boot flag is detected (YES branch of step 290), boot firmware 142 clears the RTC power loss status flag, which is stored in a register of system RTC 160 (in step 300). Clearing the RTC power loss status ensures that the boot firmware will treat the boot process as a normal boot, thereby preventing the boot firmware from loading default settings into the boot firmware 142 and ME firmware 146 regions of NV memory 140 and clearing the system date/time values maintained by the boot firmware.

If power was removed from system RTC 160 (in step 250), in lieu of resetting the RTC, the date/time values stored within the RTC microchip are lost. To avoid such loss, boot firmware 142 uses current date/time information obtained from EC real time clock 158 to restore the system date/time values maintained by the boot firmware (in step 310). In this manner, boot firmware 142 maintains accurate date/time values even if power is removed from the system RTC. Once date/time is restored (in step 310), boot firmware 142 continues to memory initialization (in step 320) and sends a "Host Up" message to EC 150 (in step 330) to indicate that the boot process is successful before continuing normal power-on behavior (in step 340).

In step 350, EC 150 waits for boot firmware 142 to send a "Host Up" message indicating that the boot was successful. If the "Host Up" message is received within a predetermined timeout (NO branch of step 360), EC 150 continues with its normal runtime behavior (in step 370). However, if a "Host Up" message is not received within the predetermined timeout (YES branch of step 360), EC 150 increments the POST attempt count (in step 380) and determines if the POST attempt count exceeds a maximum count (in step 390). Comparing the POST attempt count to the maximum count allows the boot firmware to attempt POST multiple times (e.g., 2, 3, 4, or 5) before the EC detects a no POST failure. This avoids the case where the user inadvertently or intentionally removes power from the system, which would not be considered a no POST failure.

If the POST attempt count does not exceed the maximum count (NO branch of step 290), EC 150 power cycles the system (in step 220) to restart the boot process. When the POST attempt count exceeds the maximum count (YES branch of step 290), the EC resets the POST attempt count to zero (in step 400), sets a no POST flag (in step 410) and either resets system RTC 160 or removes power from the RTC (in step 250). In one example implementation, EC 150 may reset system RTC 160 by using an EC GPIO signal (e.g., RTC_RESET #) to pull RTCRST # on PCH 120 low for a short delay, before restoring it back to high to reset the system RTC. In another example implementation, EC 150 may remove power from the RTC by disconnecting the RTC battery 170 power from the RTC for a predetermined amount of time (e.g., 100 ms). As noted above, resetting or removing power from system RTC 160 resolves no POST failures by restoring default settings within the boot firmware 142 and ME firmware 146 regions of NV memory 140. Once the RTC is reset, EC 150 reboots and power cycles the system (in step 220) to restart the boot process.

Once a sufficient core operating voltage is again supplied to host processor 102 (in step 260), the host processor begins executing program instructions within boot firmware 142 starting with the reset vector (in step 270). In step 280, boot firmware 142 reads and clears any boot flags set within EC 150. If a no POST boot flag is detected (YES branch of step 420), boot firmware 142 loads default settings within the boot firmware 142 and ME firmware 146 regions of NV memory 140 and uses current date/time information obtained from EC real time clock 158 to restore the system date/time values maintained by the boot firmware (in step 310). Once date/time is restored (in step 310), the boot firmware 142 continues to memory initialization (in step 320) and sends a "Host Up" message to EC 150 (in step 330) to indicate that the boot is successful before continuing normal power-on behavior (in step 340).

The computer implemented method shown in FIG. 3 is performed by hardware and firmware components of an information handling system (IHS) during an IHS boot process to automatically detect and recover from boot failures, such as no power failures and no POST failures, without suffering the information loss that typically occurs in conventional recovery methods. In one embodiment of method 200, an embedded controller (e.g., EC 150) within the IHS may execute program instructions stored locally within its EC firmware (e.g., EC firmware 144) to detect no power/no POST failures. For example, the embedded controller may detect a no power failure if sleep state exit signals (e.g., SLP_S5# and SLP_S3#) fail to toggle within a predetermined timeout (YES branch of step 230), and may detect a no POST failure if the boot firmware fails to successfully complete POST after multiple attempts (YES branch of step 390). When a no power/no POST failure is detected, the embedded controller recovers the system by resetting the system RTC or removing battery power from the system RTC.

Once the system is power cycled to restart the boot process, program instructions within the boot firmware (e.g., boot firmware 142) may be executed by a host processor (e.g., host processor 102) of the IHS to avoid the information loss that typically occurs when the system RTC is reset or RTC battery power is removed. When responding to a no power failure, for example, the boot firmware clears the RTC power loss status to avoid loading default settings into the boot firmware and ME firmware regions of NV memory 140 (i.e., maintains current boot firmware and ME firmware settings) and reads the EC real time clock 158 to restore the system date/time values. When responding to a no POST failure, the boot firmware loads default settings into the boot firmware and ME firmware regions of NV memory 140 (to resolve the no POST failure) and reads the EC real time clock 158 to restore the system date/time values.

It will be understood that one or more of the tasks, functions, or methodologies described herein may be implemented, for example, as firmware or as a computer program of instructions embodied in a non-transitory tangible computer readable medium that is executed by a CPU, embedded controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system (IHS), comprising:
   a system real-time clock (RTC) configured to maintain current date and time values;
   a computer readable non-volatile (NV) memory configured to store a plurality of firmware regions including boot firmware, management engine (ME) firmware, and embedded controller (EC) firmware;
   a host processor configured to execute the boot firmware when the IHS is powered on or rebooted to implement a boot process for the IHS, wherein the boot firmware is executable to perform a Power-On Self-Test (POST) during the boot process; and
   an embedded controller (EC) configured to execute the embedded controller firmware, wherein during the boot process, the EC executes program instructions contained within the EC firmware to:
      automatically detect a no power failure or a no POST failure;
      automatically reset or remove power from the system RTC, if a no power failure or a no POST failure is detected, to recover from the detected no power failure or no POST failure; and
      restart the boot process;
   wherein the boot firmware is further executable by the host processor to prevent information loss when the boot process is restarted.

2. The information handling system as recited in claim 1, wherein the EC is configured to detect the no power failure if one or more sleep state exit signals supplied from a platform controller hub (PCH) of the IHS fails to toggle within a predetermined timeout.

3. The information handling system as recited in claim 1, wherein the EC is configured to detect the no POST failure if the boot firmware performs the POST a predetermined number of times.

4. The information handling system as recited in claim 1, wherein the EC executes the program instructions contained within the EC firmware to:
   set a no power boot flag within the EC upon detecting the no power failure;
   set a no POST boot flag within the EC upon detecting the no POST failure; and
   power cycle the IHS, after resetting or removing power from the RTC, to restart the boot process in response to detecting the no power failure or the no POST failure.

5. The information handling system as recited in claim 4, wherein when the boot process is restarted, the boot firmware is further executable by the host processor to read and clear boot flags set within the EC.

6. The information handling system as recited in claim 5, wherein upon reading a no power boot flag, the boot firmware is executable to prevent information loss by clearing a RTC power loss status flag stored in a register of the system RTC to prevent the boot firmware from loading default settings within the boot firmware and the ME firmware regions of the computer readable NV memory.

7. The information handling system as recited in claim 5, wherein upon reading a no POST boot flag, the boot firmware is executable to prevent information loss by loading default settings within the boot firmware and the ME firmware regions of the computer readable NV memory.

8. The information handling system as recited in claim 5, wherein upon reading a no power boot flag or a no POST boot flag, the boot firmware is executable to prevent information loss by:
   restoring system date and time values maintained by the boot firmware using date and time values obtained from a clock included within the EC; and
   sending a message to the EC indicating that the boot process is successful.

9. The information handling system as recited in claim 8, wherein if the EC does not receive the message indicating that the boot process is successful within a predetermined timeout, the EC executes the program instructions contained within the EC firmware to:
   increment a POST attempt count;
   power cycle the IHS to restart the boot process if the POST attempt count does not exceed a maximum count; and
   detect the no POST failure if the POST attempt count exceeds the maximum count.

10. A method performed during a boot process for an information handling system (IHS) comprising a system real-time clock (RTC), the method comprising:

power sequencing components of the IHS when the IHS is powered on;
monitoring sleep state exit signals coming from a platform controller hub (PCH) of the IHS to detect toggling of the sleep state exit signals;
automatically detecting a no power failure if one or more of the sleep state exit signals fails to toggle within a predetermined timeout;
wherein upon automatically detecting the no power failure, the method further comprises:
automatically recovering from the no power failure; and
preventing information loss when the boot process is subsequently restarted.

11. The method as recited in claim 10, wherein automatically recovering from the no power failure comprises:
setting a no power boot flag within an embedded controller (EC) of the IHS;
resetting or removing power from the system RTC; and
power sequencing the IHS again to restart the boot process.

12. The method as recited in claim 11, wherein the steps of power sequencing components of the IHS, monitoring sleep state exit signals, automatically detecting a no power failure, automatically recovering from the no power failure, setting a no power boot flag, resetting or removing power from the system RTC and power sequencing the IHS again to restart the boot process are performed by the EC executing EC firmware.

13. The method as recited in claim 11, wherein after said power sequencing the IHS again to restart the boot process, the method further comprises:
reading and clearing the no power boot flag set within the EC;
clearing a RTC power loss status flag stored within a register of the system RTC;
restoring system date and time values using date and time values obtained from a clock included within the EC; and
sending a message to the EC indicating that the boot process is successful.

14. The method as recited in claim 13, wherein the steps of reading and clearing the no power boot flag, clearing a RTC power loss status flag, restoring system date and time values and sending a message to the EC are performed by a host processor of the IHS executing boot firmware.

15. A method performed during a boot process for an information handling system (IHS) comprising a system real-time clock (RTC), the method comprising:
power sequencing components of the IHS when the IHS is powered on;
waiting to receive a message indicating that the boot process is successful; and
automatically detecting a no POST failure if the message is repeatedly not received within a predetermined timeout;
wherein upon automatically detecting the no power failure, the method further comprises:
automatically recovering from the no power failure; and
preventing information loss when the boot process is subsequently restarted.

16. The method as recited in claim 15, wherein prior to said automatically detecting a no POST failure, the method comprises:
incrementing a POST attempt count if the message is not received within the predetermined timeout;
power sequencing the IHS to restart the boot process if the POST attempt count does not exceed a maximum count; and
automatically detecting the no POST failure if the POST attempt count exceeds the maximum count.

17. The method as recited in claim 15, wherein automatically recovering from the no POST failure comprises:
setting a no POST boot flag within an embedded controller (EC) of the IHS;
resetting or removing power from the system RTC; and
power sequencing the IHS again to restart the boot process.

18. The method as recited in claim 17, wherein the steps of power sequencing components of the IHS, waiting to receive a message, automatically detecting a no POST failure, automatically recovering from the no POST failure, setting a no POST boot flag, resetting or removing power from the system RTC, and power sequencing the IHS again to restart the boot process are performed by the EC executing EC firmware.

19. The method as recited in claim 17, wherein after said power sequencing the IHS again to restart the boot process, the method further comprises:
reading and clearing the no POST boot flag set within the EC;
loading default settings within boot firmware and management firmware regions of a computer readable non-volatile memory included within the IHS;
restoring system date and time values using date and time values obtained from a clock included within the EC; and
sending a message to the EC indicating that the boot process is successful.

20. The method as recited in claim 19, wherein the steps of reading and clearing the no POST boot flag, loading default settings, restoring system date and time values and sending a message to the EC are performed by a host processor of the IHS executing boot firmware.

21. An information handling system (IHS), comprising:
a system real-time clock (RTC) configured to maintain current date and time values;
a computer readable non-volatile (NV) memory configured to store a plurality of firmware regions including boot firmware, management engine (ME) firmware, and embedded controller (EC) firmware;
a host processor configured to execute the boot firmware when the IHS is powered on or rebooted to implement a boot process for the IHS, wherein the boot firmware is executable to perform a Power-On Self-Test (POST) during the boot process; and
an embedded controller (EC) configured to execute the embedded controller firmware, wherein during the boot process, the EC executes program instructions contained within the EC firmware to:
detect a no power failure or a no POST failure; and
reset or remove power from the system RTC if a no power failure or a no POST failure is detected;
wherein the EC executes the program instructions contained within the EC firmware to:
set a no power boot flag within the EC upon detecting the no power failure;
set a no POST boot flag within the EC upon detecting the no POST failure; and
power cycle the IHS, after resetting or removing power from the RTC, to restart the boot process in response to detecting the no power failure or the no POST failure;

wherein during the boot process, the boot firmware is further executable by the host processor to read and clear boot flags set within the EC; and wherein upon reading a no power boot flag or a no POST boot flag, the boot firmware is further executable to:
   restore system date and time values maintained by the boot firmware using date and time values obtained from a clock included within the EC; and
   send a message to the EC indicating that the boot process is successful.

22. The information handling system as recited in claim 21, wherein if the EC does not receive the message indicating that the boot process is successful within a predetermined timeout, the EC executes the program instructions contained within the EC firmware to:
   increment a POST attempt count;
   power cycle the IHS to restart the boot process if the POST attempt count does not exceed a maximum count; and
   detect the no POST failure if the POST attempt count exceeds the maximum count.

* * * * *